(12) United States Patent
Kaneda et al.

(10) Patent No.: US 7,809,284 B2
(45) Date of Patent: Oct. 5, 2010

(54) SYSTEM AND METHOD FOR RECEIVING COHERENT, POLARIZATION-MULTIPLEXED OPTICAL SIGNALS

(75) Inventors: Noriaki Kaneda, Eatontown, NJ (US); Andreas B. Leven, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 805 days.

(21) Appl. No.: 11/426,191

(22) Filed: Jun. 23, 2006

(65) Prior Publication Data
US 2007/0297806 A1    Dec. 27, 2007

(51) Int. Cl.
*H04B 10/06* (2006.01)
(52) U.S. Cl. .............. 398/204; 398/203; 398/205; 398/206; 398/207
(58) Field of Classification Search .......... 398/203–207
See application file for complete search history.

(56) References Cited

U.S. PATENT DOCUMENTS

| | | | | |
|---|---|---|---|---|
| 4,718,120 A * | 1/1988 | Tzeng | .......... | 398/204 |
| 4,723,316 A * | 2/1988 | Glance | .......... | 398/204 |
| 4,829,598 A * | 5/1989 | Auracher et al. | .......... | 398/204 |
| 4,856,093 A * | 8/1989 | Mohr | .......... | 398/204 |
| 5,003,625 A * | 3/1991 | Khoe | .......... | 398/204 |
| 5,023,946 A * | 6/1991 | Yamazaki et al. | .......... | 398/204 |
| 5,027,436 A * | 6/1991 | Delavaux | .......... | 398/202 |
| 5,052,051 A * | 9/1991 | Naito et al. | .......... | 398/204 |
| 5,060,312 A * | 10/1991 | Delavaux | .......... | 398/204 |
| 5,323,258 A * | 6/1994 | Tsushima et al. | .......... | 398/203 |
| 5,396,361 A * | 3/1995 | Sasaki et al. | .......... | 398/1 |
| 5,459,599 A * | 10/1995 | Van Deventer | .......... | 398/136 |
| 5,473,463 A * | 12/1995 | van Deventer | .......... | 398/205 |
| 6,362,874 B1 * | 3/2002 | Madsen | .......... | 356/73.1 |
| 6,782,211 B1 * | 8/2004 | Core | .......... | 398/205 |
| 6,917,031 B1 * | 7/2005 | Sun et al. | .......... | 250/214 R |
| 7,110,677 B2 * | 9/2006 | Reingand et al. | .......... | 398/98 |

(Continued)

FOREIGN PATENT DOCUMENTS

EP    0640854 A2    3/1995

(Continued)

OTHER PUBLICATIONS

Singh et al. ("New phase and polarization-insensitive receivers for coherent optical fibre communication systems" Optical and Quantum Electronics, pp. 343-346; published 1989).*

(Continued)

*Primary Examiner*—Ken N Vanderpuye
*Assistant Examiner*—Danny W Leung
(74) *Attorney, Agent, or Firm*—Hitt Gaines, PC

(57) ABSTRACT

An apparatus, a polarization diversity receiver and a method of receiving a received optical signal. In one embodiment, the apparatus includes: (1) an optical device configured to separate in-phase and quadrature components of a received optical signal, to transmit the in-phase components to a first optical output thereof and to transmit the quadrature components to a second optical output thereof, (2) a first polarization splitter coupled to receive light at the first optical output and (3) a second polarization splitter coupled to receive light at the second optical output.

20 Claims, 3 Drawing Sheets

U.S. PATENT DOCUMENTS

| | | | |
|---|---|---|---|
| 7,167,651 B2* | 1/2007 | Shpantzer et al. | 398/77 |
| 7,171,129 B1* | 1/2007 | Blair et al. | 398/203 |
| 7,315,575 B2* | 1/2008 | Sun et al. | 375/229 |
| 7,315,699 B2* | 1/2008 | Jennen et al. | 398/205 |
| 7,327,913 B2* | 2/2008 | Shpantzer et al. | 385/15 |
| 7,397,979 B2* | 7/2008 | Shpantzer et al. | 385/14 |
| 7,460,793 B2* | 12/2008 | Taylor | 398/208 |
| 7,483,600 B2* | 1/2009 | Achiam et al. | 385/14 |
| 7,509,054 B2* | 3/2009 | Calabro et al. | 398/152 |
| 7,529,490 B2* | 5/2009 | Hoshida | 398/207 |
| 7,555,227 B2* | 6/2009 | Bontu et al. | 398/202 |
| 7,609,979 B2* | 10/2009 | Taylor | 398/204 |
| 7,627,252 B2* | 12/2009 | Sun et al. | 398/155 |
| 2002/0186435 A1* | 12/2002 | Shpantzer et al. | 359/136 |
| 2004/0096143 A1* | 5/2004 | Shpantzer et al. | 385/16 |
| 2004/0114939 A1* | 6/2004 | Taylor | 398/152 |
| 2004/0208646 A1* | 10/2004 | Choudhary et al. | 398/188 |
| 2005/0196176 A1* | 9/2005 | Sun et al. | 398/152 |
| 2006/0013590 A1* | 1/2006 | Hueda et al. | 398/149 |
| 2006/0228118 A1* | 10/2006 | Schemmann et al. | 398/184 |
| 2007/0071456 A1* | 3/2007 | Chen et al. | 398/204 |
| 2007/0110362 A1* | 5/2007 | Shpantzer et al. | 385/15 |
| 2007/0147850 A1* | 6/2007 | Savory et al. | 398/208 |
| 2007/0206963 A1* | 9/2007 | Koc | 398/202 |
| 2007/0297806 A1* | 12/2007 | Kaneda et al. | 398/152 |
| 2009/0074428 A1* | 3/2009 | Liu | 398/208 |
| 2009/0086215 A1* | 4/2009 | Liu et al. | 356/491 |
| 2009/0103921 A1* | 4/2009 | Frankel | 398/65 |
| 2009/0190929 A1* | 7/2009 | Khurgin et al. | 398/79 |

FOREIGN PATENT DOCUMENTS

| | | |
|---|---|---|
| WO | 8607513 | 12/1986 |
| WO | 2004054138 | 6/2004 |

OTHER PUBLICATIONS

Singh et al. ("Performance of phase and polarisation insensitive receivers for coherent optical fibre communication systems" IEE Proceedings, vol. 137, Aug. 1990).*

Kazovsky, L.G., "Phase- and Polarization-Diversity Coherent Optical Techniques", Journal of Lightwave Technology, vol. 7, Issue 2, Feb. 1989, pp. 279-292.

* cited by examiner

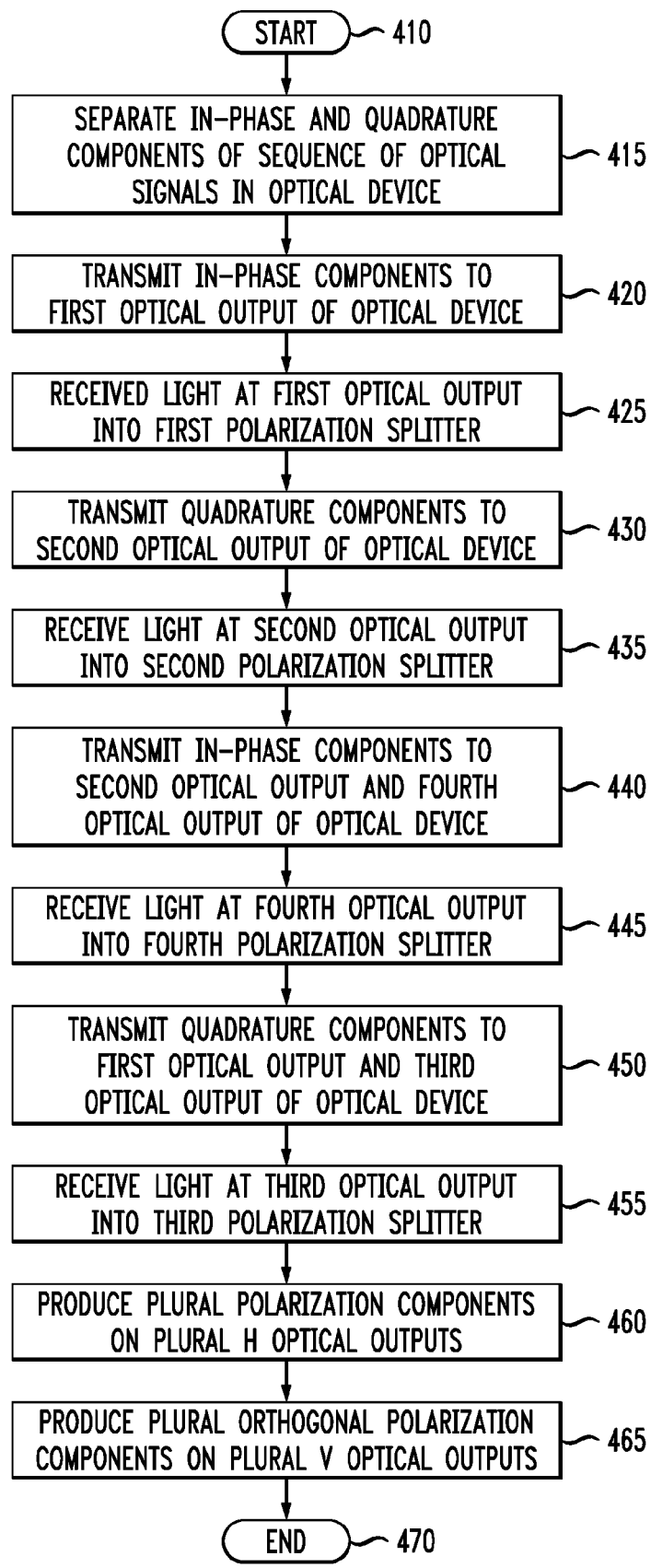

SYSTEM AND METHOD FOR RECEIVING COHERENT, POLARIZATION-MULTIPLEXED OPTICAL SIGNALS

TECHNICAL FIELD OF THE INVENTION

The invention is directed, in general, to optical coherent communication systems and, more particularly, to a system and method for receiving coherent, polarization-multiplexed optical signals.

BACKGROUND OF THE INVENTION

Optical coherent communication systems widely researched due to their potential ability to communicate vast amounts of information quickly. In optical coherent communication systems, a so-called "optical hybrid" is used to overlay a received optical signal and a local oscillator optical signal, resulting in a demodulation of the received optical signal and yielding in-phase components I and $\underline{I}$ and quadrature components Q and $\underline{Q}$. These components I, $\underline{I}$, Q and $\underline{Q}$, are then transformed into electrical signals using photodetectors. This configuration is sometimes called a "phase diversity receiver." Electronic logic circuitry can then be used to compare the electrical signals to one another, one or more thresholds, or both, to yield output data.

The local oscillator optical signal and received optical signal should have the same polarization orientation to beat properly with each other. Unfortunately, by the time the received optical signal has reached the receiver, it has experienced arbitrary polarization transformation as a result of being transmitted over a fiber. Therefore, the receiver has either to track the polarization state using a polarization controller in the local oscillator optical signal path or use a configuration called "polarization diversity receiver." A polarization diversity receiver is preferred if one wants to use a polarization multiplexed signal to use two, preferably linear and orthogonal, polarization states to transmit data. A conventional polarization diversity receiver employs a polarization splitter to split the signal path and two optical hybrids, each fed with a properly aligned local oscillator optical signal (see, e.g., Kazovsky, "Phase- and Polarization-Diversity Coherent Optical Techniques," J. Lightwave Technol., vol. LT-7, no. 2, pp. 279-292, February 1989).

Unfortunately, an optical hybrid is a relatively expensive device. A polarization diversity receiver that employs two optical hybrids can be so expensive that many applications that could benefit from it cannot justify it simply as a result of the cost alone.

Accordingly, what is needed in the art is a better architecture for a polarization diversity receiver. More specifically, what is needed in the art is a polarization diversity receiver with a reduced manufacturing cost.

SUMMARY OF THE INVENTION

To address the above-discussed deficiencies of the prior art, the invention provides, in one aspect, an apparatus. In one embodiment, the apparatus includes: (1) an optical device configured to separate in-phase and quadrature components of a received optical signal, to transmit the in-phase components to a first optical output thereof and to transmit the quadrature components to a second optical output thereof, (2) a first polarization splitter coupled to receive light at the first optical output and (3) a second polarization splitter coupled to receive light at the second optical output.

In another aspect, the invention provides a polarization diversity receiver. In one embodiment, the receiver includes: (1) a polarization diverse optical hybrid configured to separate in-phase and quadrature components of a received optical signal, to transmit the in-phase components to a first optical output thereof and to transmit the quadrature components to a second optical output thereof, (2) a first polarization splitter coupled to receive light at the first optical output and (3) a second polarization splitter coupled to receive light at the second optical output.

In another aspect, the invention provides a method of receiving a received optical signal. In one embodiment, the method includes: (1) separating in-phase and quadrature components of the received optical signal of an optical device, (2) transmitting the in-phase components to a first optical output of the optical device, (3) receiving light at the first optical output into a first polarization splitter, (4) transmitting the quadrature components to a second optical output of the optical device and (5) receiving light at the second optical output into a second polarization splitter.

The foregoing has outlined preferred and alternative features of the invention so that those skilled in the pertinent art may better understand the detailed description that follows. Additional features will be described hereinafter that form the subject of the claims. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which:

FIG. 4 illustrates a flow diagram of one embodiment of a method of receiving a received optical signal carried out according to the principles of the invention.

DETAILED DESCRIPTION

Figure 1:
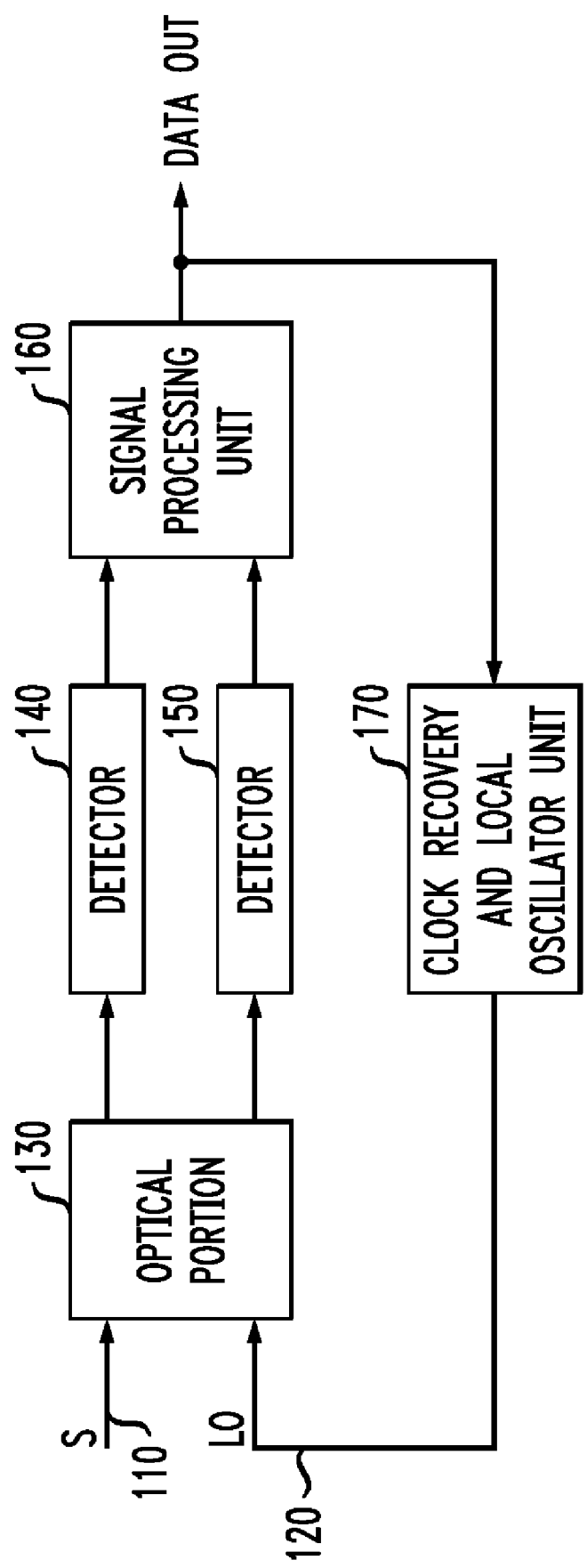
FIG. 1 illustrates a block diagram of a polarization diversity receiver configured to demodulate and convert a polarization multiplexed optical signal into electrical signals representing in-phase and quadrature components of the polarization multiplexed optical signal.

Referring initially to FIG. 1, illustrated is a block diagram of a polarization diversity receiver generally designated 100 and configured to demodulate and convert a received optical signal S 110 that is coherent and polarization-multiplexed into electrical signals representing in-phase and quadrature components of S 110. Unlike conventional polarization diversity receivers, the receiver 100 needs only one optical hybrid.

The receiver 100 receives and demodulates S 110 using a coherent, local oscillator optical signal LO 120. S 110 and LO 120 are received into an optical portion 130, which may include a polarization-insensitive optical hybrid. The optical portion 130 splits and couples S 110 and LO 120 in a manner that will be shown in FIG. 3 to yield at least two output optical signals that are respectively provided to detectors 140, 150, which are photodetectors, such as photodiodes. In turn, the detectors 140, 150 provide electrical signals to a signal processing unit 160, which is responsible for extracting digital data from the electrical signals. The digital data are provided at an output called DATA OUT. DATA OUT is also provided to a clock recovery and local oscillator unit 170, which is responsible for extracting a clock signal and generating LO 120 based thereon. While those skilled in the pertinent art are familiar with the overall receiver 100 architecture of FIG. 1, the configuration of the optical portion 130 of the receiver 100 is fundamentally different from conventional polarization diversity receivers as will now be seen with reference to FIG. 2.

Figure 2:
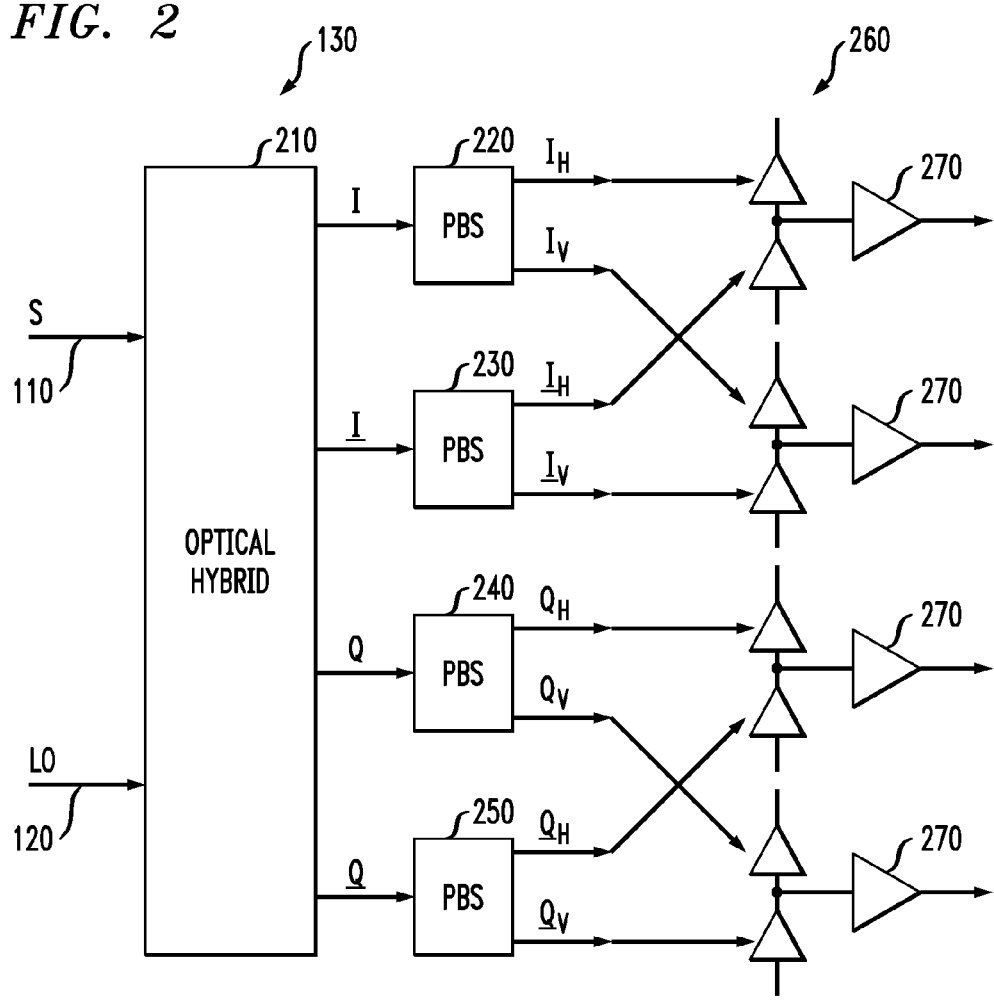
FIG. 2 illustrates in greater detail the optical portion of the polarization diversity receiver of FIG. 1 constructed according to the principles of the invention.

Turning now to FIG. 2, illustrated is in greater detail the optical portion of the polarization diversity receiver 100 of FIG. 1 constructed according to the principles of the invention. The optical portion 130 includes an optical device 210, which in the embodiment of FIG. 2 is a polarization-insensitive optical hybrid. In the context of the invention, "polarization-insensitive" means that the optical hybrid exhibits substantially polarization-independent characteristics with respect to its intended technical function, e.g., insertion loss, power split ratio, and phase-shifting. For example, a 90° ($\pi/2$) phase shifter should provide a 90°±5° phase shift for all polarization states.

The optical device 210 has two optical inputs and four optical outputs. As FIG. 2 shows, the first optical input receives LO 120, and the second optical input receives S 110. The first optical output provides I, the second optical output provides Q, the third optical output provides $\underline{I}$, and the fourth optical output provides $\underline{Q}$. A polarization beam splitter (PBS) is coupled to each of the four optical outputs. Specifically, a first PBS 220 is coupled to the first optical output (I), a second PBS 230 is coupled to the third optical output ($\underline{I}$), a third PBS 240 is coupled to the second optical output (Q), and a fourth PBS 250 is coupled to the fourth optical output ($\underline{Q}$). Each PBS 220, 230, 240, 250 has two outputs, each labeled "H" and "V." Thus, eight signals are produced. The PBS 220 produces $I_H$ and $I_V$, the PBS 230 produces $\underline{I}_H$ and $\underline{I}_V$, the PBS 240 produces $Q_H$ and $Q_V$, and the PBS 250 produces $\underline{Q}_H$ and $\underline{Q}_V$. $I_H$, $I_V$, $\underline{I}_H$, $\underline{I}_V$, $Q_H$, $Q_V$, $\underline{Q}_H$ and $\underline{Q}_V$ are provided to photodetectors 260 configured as four differential pairs. The four differential pairs of photodetectors 260 are coupled to respective preamplifiers 270. The preamplifiers 270 may be balanced or single-ended.

Each PBS 220, 230, 240, 250 may be aligned to the optical device 210 such that, for a linear polarized input signal at the first or second optical inputs, the ratio of the optical power at the two output ports H and V of each PBS 220, 230, 240, 250 is substantially the same for all four PBSs 220, 230, 240, 250. For the receiver 100 of FIG. 1 to work best, the polarization state of the LO should also be aligned to the optical device 210 so that the aforementioned power ratio is close to one, although the invention requires no particular alignment on the part of the PBSs 220, 230, 240, 250 or the LO.

Referring back briefly to FIG. 1, the optical portion 130 (which includes the optical device 210 and the four PBSs 220, 230, 240, 250) and detectors 140 (which include the photodetectors 260) may take the form of discrete devices or may instead be integrated (located on a single substrate or in a common module). In the latter case, the single substrate or common module may also include the preamplifiers 270 or other electrical circuitry as may be deemed advantageous for a given application.

Figure 3:
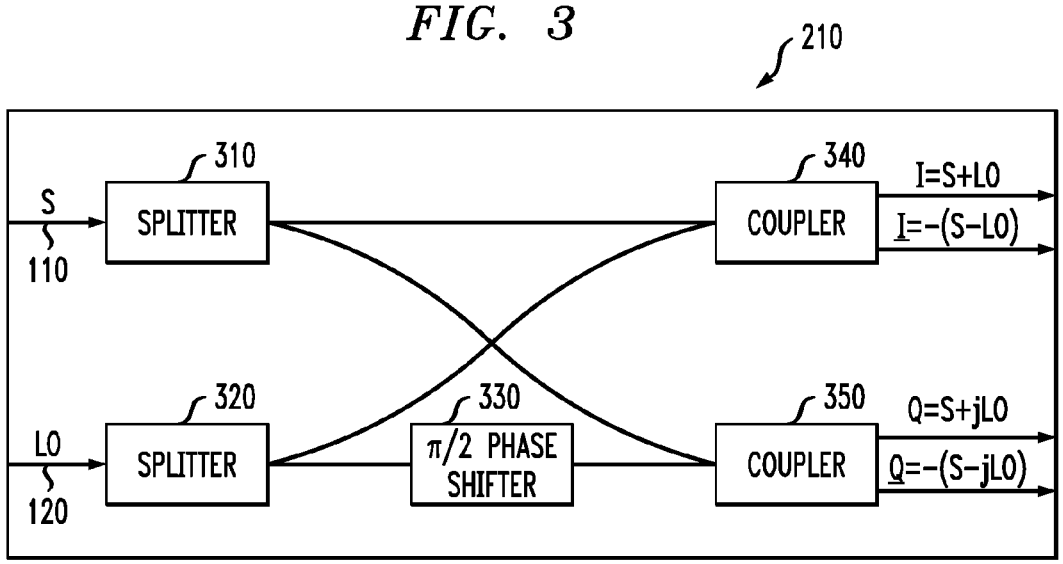
FIG. 3 illustrates a block diagram of one embodiment of an optical hybrid that may be employed in the optical portion of FIG. 2.

Turning now to FIG. 3, illustrated is a block diagram of one embodiment of an optical hybrid that may be employed in the optical portion of FIG. 2. The optical hybrid 210 is illustrated as being a 90° optical hybrid 210. The optical hybrid 210 has first and second optical inputs for receiving LO 120 and S 110, respectively.

A first splitter 310 is configured to receive S 110 and split S 110. The first splitter 310 may be a 3 dB splitter. A second splitter 320 is configured to receive LO 120 and split LO 120. The second splitter 320 may be a 3 dB splitter. A $\pi/2$ phase shifter 330 is coupled to the second splitter 320. The $\pi/2$ phase shifter 330 is configured to phase-retard light transmitted from the second splitter 320 to the coupler 350 by 90°.

A first coupler 340 is coupled to the first splitter 310 and the second splitter 320. The first coupler 340 is configured to cause light transmitted from the first splitter 310 and the second splitter 320 to couple and interfere. The first coupler 340 has two outputs. The first output yields I, which is S+LO. The second output yields $\underline{I}$, which is −(S−LO).

A second coupler 350 is coupled to the first splitter 310 and the $\pi/2$ phase shifter 330. The second coupler 350 is configured to cause light transmitted from the first splitter 310 and the $\pi/2$ phase shifter 330 to couple and interfere. The second coupler 350 has two outputs. The first output yields Q, which is S+jLO, where j represents a complex number. (LO and jLO have a $\pi/2$ phase difference, which is created by a $\pi/2$ phase shifter.) The second output yields $\underline{Q}$, which is −(S−jLO). As described above, I, $\underline{I}$, Q and $\underline{Q}$ are provided to four PBSs, which provide $I_H$, $I_V$, $\underline{I}_H$, $\underline{I}_V$, $Q_H$, $Q_V$, $\underline{Q}_H$ and $\underline{Q}_V$, respectively.

Turning now to FIG. 4, illustrated is a flow diagram of one embodiment of a method of receiving a received optical signal carried out according to the principles of the invention. It should be understood that, while the various steps of the method are set forth as though they are carried out sequentially, some are carried out concurrently. Even those occurring sequentially may appear to be simultaneous given the extreme speed of light.

The method begins in a start step 410. In a step 415, in-phase and quadrature components of the received optical signal are received into and separated in an optical device. In one embodiment, the optical device is a polarization-insensitive optical hybrid.

In a step 420, the in-phase components are transmitted to a first optical output of the optical device. In a step 425, light at the first optical output is received into a first polarization splitter. In a step 430, the quadrature components are transmitted to a second optical output of the optical device. In a step 435, light at the second optical output is received into a second polarization splitter.

In a step 440, the in-phase components are also transmitted to the second optical output and a fourth optical output of the optical device. In a step 445, light at the fourth optical output is received into a fourth polarization splitter. In a step 450, the quadrature components are also transmitted to the first optical output and a third optical output of the optical device. In a step 455, light at the third optical output is received into a third polarization splitter. In one embodiment, the first and third optical outputs are configured to function as a pair of differential outputs. Likewise, the second and fourth optical outputs are configured to function as a pair of differential outputs.

In a step 460, plural polarization components are produced on plural H optical outputs. In a step 465, plural orthogonal polarization components are produced on plural V optical outputs. The method ends in an end step 470.

Although the invention has been described in detail, those skilled in the pertinent art should understand that they can make various changes, substitutions and alterations herein without departing from the spirit and scope of the invention in its broadest form.

What is claimed is:

1. An apparatus, comprising:
   an optical device having a first and a second optical input and a first and a second optical output, said device being configured to separate an in-phase component and a quadrature component of a polarization-multiplexed received optical signal received at said first optical input, to transmit said polarization-multiplexed in-phase component to said first optical output, and to transmit said polarization-multiplexed quadrature component to said second optical output;
   a local optical oscillator coupled to said second optical input;
   a first polarization splitter coupled to receive light at said first optical output; and
   a second polarization splitter coupled to receive light at said second optical output.

2. The apparatus as recited in claim 1 wherein each of said first and second polarization splitters produces one polarization component on an H optical output and an orthogonal polarization component on a V optical output, said local optical oscillator being coupled to said optical device such that light from said local optical oscillator is transmitted to said H and V optical outputs.

3. The apparatus as recited in claim 1, wherein said local optical oscillator is polarization aligned to said first and second polarization splitters.

4. The apparatus as recited in claim 1 wherein said polarization-multiplexed in-phase component is a first polarization-multiplexed in-phase component and said polarization-multiplexed quadrature component is a first polarization-multiplexed quadrature component, and said optical device is configured to transmit a second polarization-multiplexed in-phase component to a third optical output and a second polarization-multiplexed quadrature component to a fourth optical output, said first and third optical outputs configured to function as a pair of polarization-multiplexed in-phase differential outputs and said second and fourth optical outputs configured to function as a pair of polarization-multiplexed quadrature differential outputs.

5. The apparatus as recited in claim 4 further comprising:
   a third polarization splitter coupled to receive light from said third optical output; and
   a fourth polarization splitter coupled to receive light from said fourth optical output.

6. The apparatus as recited in claim 1 wherein an optical path of said optical device comprises a 90° phase-shifter.

7. A polarization diversity receiver, comprising:
   a polarization diverse optical hybrid having a first and a second optical input and a first and a second optical output, said hybrid being configured to separate in-phase and quadrature components of a received polarization-multiplexed optical signal received at said first optical input, to transmit polarization-multiplexed in-phase components of said received optical signal to said first optical output and to transmit polarization-multiplexed quadrature components of said received optical signal to said second optical output;
   a local optical oscillator coupled to said second optical input;
   a first polarization splitter coupled to receive light at said first optical output; and
   a second polarization splitter coupled to receive light at said second optical output.

8. The receiver as recited in claim 7 wherein each of said first and second polarization splitters produces one polarization component on an H optical output and an orthogonal polarization component on a V optical output, said local optical oscillator being coupled to said polarization diverse optical hybrid such that light from said local optical oscillator is transmitted to said H and V optical outputs.

9. The receiver as recited in claim 7 wherein said local optical oscillator is polarization aligned to said first and second polarization splitters.

10. The receiver as recited in claim 7 wherein said polarization diverse optical hybrid is configured to transmit said in-phase components to said first optical output and a third optical output and said quadrature components to said second optical output and a fourth optical output, said first and third optical outputs configured to function as a pair of differential outputs and said second and fourth optical outputs configured to function as a pair of differential outputs.

11. The receiver as recited in claim 10 further comprising:
    a third polarization splitter coupled to receive light from said third optical output; and
    a fourth polarization splitter coupled to receive light from said fourth optical output.

12. The receiver as recited in claim 7 wherein an optical path of said polarization diverse optical hybrid comprises a 90° phase-shifter.

13. A method of receiving a received polarization-multiplexed optical signal, comprising:
    separating polarization-multiplexed in-phase components and polarization-multiplexed quadrature components of said received polarization-multiplexed optical signal in an optical device;
    transmitting said polarization-multiplexed in-phase components to a first optical output of said optical device;
    receiving light at said first optical output into a first polarization splitter;
    transmitting said polarization-multiplexed quadrature components to a second optical output of said optical device; and
    receiving light at said second optical output into a second polarization splitter.

14. The method as recited in claim 13 further comprising:
    producing plural polarization components of said polarization-multiplexed optical signal on plural H optical outputs of said first and second polarization splitters;
    producing plural orthogonal polarization components of said polarization-multiplexed optical signal on plural V optical outputs of said first and second polarization splitters; and
    transmitting light from a local optical oscillator to said H and V optical outputs.

15. The method as recited in claim 13 further comprising:
    transmitting said polarization-multiplexed in-phase components to said first optical output and a third optical output; and
    transmitting said polarization-multiplexed quadrature components to said second optical output and a fourth optical output, said first and third optical outputs configured to function as a pair of differential outputs and said second and fourth optical outputs configured to function as a pair of differential outputs.

16. The method as recited in claim 15 further comprising:
    receiving light at said third optical output into a third polarization splitter; and
    receiving light at said fourth optical output into a fourth polarization splitter.

17. The apparatus as recited in claim 2, wherein said local optical oscillator signal is polarization-aligned to said first and second polarization splitters to result in a first ratio of optical power of said H and V optical outputs of said first polarization splitter being substantially the same as a second ratio of optical power of said H and V optical outputs of said second polarization splitter.

18. The receiver as recited in claim 8, wherein said local optical oscillator signal and said first and second polarization splitters are polarization-aligned to result in a first ratio of optical power of said H and V optical outputs of said first polarization splitter being substantially the same as a second ratio of optical power of said H and V optical outputs of said second polarization splitter.

19. The method as recited in claim 14, wherein a signal generated by said local optical oscillator is polarization-aligned with said first and second polarization splitters to result in a first ratio of optical power of said H and V optical outputs of said first polarization splitter being substantially the same as a second ratio of optical power of said H and V optical outputs of said second polarization splitter.

20. The apparatus as recited in claim 1, wherein third and fourth polarization splitters are coupled to receive light at respective third and fourth optical outputs of said optical device, each of said third and fourth polarization splitters being configured to produce one polarization component on an H optical output and an orthogonal polarization component on a V optical output, said local optical oscillator being coupled to said optical device such that light from said local optical oscillator is transmitted to said H and V optical outputs of said third and fourth polarization splitters.

* * * * *